United States Patent
Ocampo

(10) Patent No.: US 6,341,749 B1
(45) Date of Patent: Jan. 29, 2002

(54) METHOD OF SIMULTANEOUSLY REDUCING INCLINATION AND ECCENTRICITY FOR GEOSTATIONARY ORBIT TRANSFER

(75) Inventor: Cesar A. Ocampo, El Segundo, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/160,927

(22) Filed: Sep. 25, 1998

(51) Int. Cl.[7] .............................. B64G 1/00; B64G 1/22
(52) U.S. Cl. ...................... 244/158 R; 701/3; 701/13; 701/226
(58) Field of Search ............................ 244/158 R, 169, 244/172, 164, 168; 701/226, 3, 13

(56) References Cited

U.S. PATENT DOCUMENTS 3,012,728 A * 12/1961 Marner ...................... 701/226
3,944,172 A * 3/1976 Becker ....................... 244/169
4,943,014 A * 7/1990 Harwood et al. ........ 244/158 R
5,595,360 A * 1/1997 Spitzer .................... 244/158 R
5,934,619 A * 8/1999 Fischer et al. .............. 244/164

FOREIGN PATENT DOCUMENTS

EP          0047211       * 3/1982 .................. 244/169

* cited by examiner

Primary Examiner—Peter M. Poon
Assistant Examiner—Judith A. Nelson
(74) Attorney, Agent, or Firm—Terje Gudmestad

(57) ABSTRACT

A method and apparatus is provided for calculating an estimate of thrust vectors and burn times for an optimal two-burn orbit transfer from an inclined, eccentric initial orbit to a geostationary final orbit. A non-linear root finding algorithm is used to calculate the thrust vectors and burn times for the optimal two-burn orbit transfer. Thrust vectors and burn times are then computed for an optimal multi-segment orbit transfer from the initial orbit to the final orbit.

12 Claims, 4 Drawing Sheets

Microfiche Appendix Included
(1 Microfiche, 375 Pages)

METHOD OF SIMULTANEOUSLY REDUCING INCLINATION AND ECCENTRICITY FOR GEOSTATIONARY ORBIT TRANSFER

APPENDIX

A microfiche appendix containing 375 frames on one card and is included in this specification and is hereafter referenced to as Appendix A.

BACKGROUND OF THE INVENTION (a) Field of the Invention

The present invention relates generally to orbital transfer, and more particularly, to an apparatus and method of translating a spacecraft from an inclined, eccentric orbit to a geostationary orbit in a time efficient manner while minimizing the energy required for the orbital transfer.

(b) Description of Related Art

Several general orbit transfer strategies are presently used for placing a spacecraft into a geostationary orbit. These methods are based on the classical generalized Hohmann transfer strategies that have been shown to be optimal in the context of the two-body problem. Other strategies for translating a spacecraft from an injection orbit to a geostationary orbit are disclosed in Spitzer U.S. Pat. No. 5,595,360, the entirety of which is hereby incorporated by reference.

SUMMARY OF THE INVENTION

This invention is directed to an apparatus and method for translating a spacecraft from a geosynchronous, inclined, and eccentric orbit to a geostationary orbit. The apparatus includes a propulsion thruster oriented on the spacecraft to generate a thrust having a predetermined force on the spacecraft. The apparatus further includes a controller for controlling the direction and timing of firing the propulsion thruster.

The controller includes means for calculating optimal direction and timing of firing of the propulsion thruster to translate the orbit of the spacecraft from the initial transfer orbit to the geostationary orbit utilizing a nonlinear parameter optimization algorithm.

In accordance with one aspect of the present invention, a method is provided for transferring a satellite from a initial orbit about the earth, the initial orbit having a first period inclination and a first eccentricity, to a final orbit about the earth, the final orbit having a second period inclination and a second eccentricity. The method comprises the steps of calculating an estimate of thrust vectors and burn times for an optimal two-burn orbit transfer from the initial orbit to the final orbit, using a non-linear root finding algorithm and computing thrust vectors and burn times for an optimal multi-segment orbit transfer from the initial orbit to the final orbit.

The invention itself, together with further objects and attendant advantages, will be best understood by reference to the following detailed description, taken in conjunction with the accompanying drawing.

DESCRIPTION OF THE PREFERRED EMBODIMENT

Figure 1:
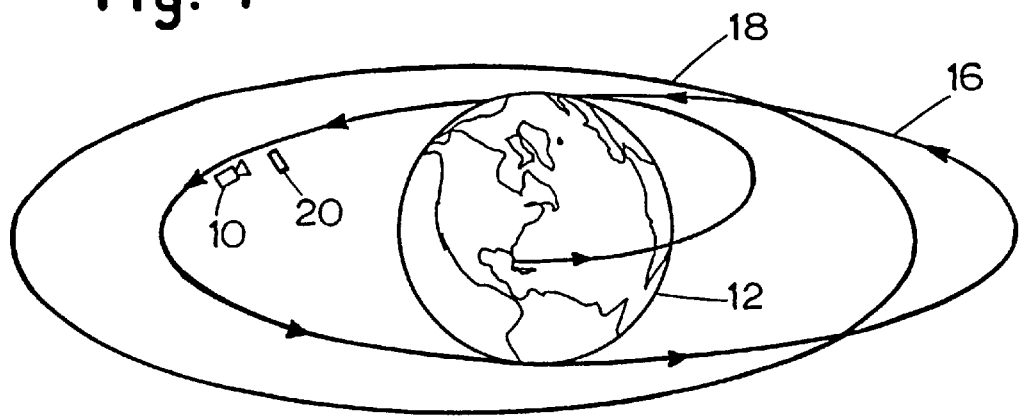
FIG. 1 illustrates a typical injection sequence for launching a spacecraft from ground zero to an injection orbit.

The following description of the preferred embodiments is merely exemplary in nature and not intended to limit the invention or its application or uses. In this specification, note that elements having similar structures or functions will be referred to using like reference numerals.

Given an initial state, it is desired to determine a set of thruster on and off times in addition to the thrust vector direction(s) that will transfer the spacecraft to a final state. Further, it is desired to achieve this transfer in minimum time or minimum fuel. The thruster on and off times and the thrust vector directions are the independent parameters that are searched for; the final state is the set of orbital targets or constraints. The scalar value for the transfer time or the fuel is the performance index. Given a value for all of the independent parameters, an open loop solution can be obtained by integrating the equations of motion numerically in the presence of all of the perturbations. This set of parameters will then produce a trajectory that will in general, not achieve the desired orbital targets. It is the goal of an optimization algorithm to modify the independent parameters in such a way that the resulting trajectory will satisfy all of the intermediate and terminal constraints while minimizing, at least locally, the performance index.

Required for this technique is a nonlinear programming parameter optimization algorithm. Such a routine searches for a minimum of a scalar function that depends on a set of parameters that are subject to both equality constraints and inequality constraints. The scalar function to minimize can be taken to be xenon propellant consumed, $m_p$, or the negative of the final spacecraft mass, $-m_f$. A subset of the independent parameters are the right ascension and declination of the thrust vector for each thrust segment. The equality constraints are the orbital targets. Placing constraints on the thrust vector direction or the locations of the coast periods required for attitude and Earth acquisition calibrations are handled via inequality constraints.

Because it is difficult to fly a spacecraft with a nonlinearly varying thrust vector attitude, it is necessary to break up the transfer into segments where the thrust vector attitude is held inertially fixed for the duration of each segment. Segments are separated from other segments or coast periods by node points. A small coast period is inserted between segments to allow time to perform a reorientation maneuver of the thrust vector.

The nonlinear constraints can be defined by any set of independent orbital targets. However, whether these targets can be achieved depends highly on the transfer strategy and discretization used. The orbital targets are specified via a set of osculating classical orbital elements. These are transformed into an angular momentum vector and an eccentricity vector, each of dimension three for a total of six scalar quantities; any five of these uniquely define an orbit. The sixth element targeted is the osculating mean longitude which places the spacecraft above the desired longitude when the eccentricity is near zero. Achieving the station longitude is made by targeting the osculating value for the mean longitude instead of the osculating value for the true longitude. The mean longitude is defined here to be the longitude that corresponds to a fictitious point coincident with the mean anomaly of the spacecraft.

Having structured the optimization problem, the equations of motion are used to propagate the system between reference times in order to evaluate the required values for the cost and constraint functions. The complexity of the dynamic model can be chosen to accurately model the environment in which the spacecraft will operate. Therefore, since this transfer solution will be used for actual orbital operations of the spacecraft, a detailed model is used for orbit propagation.

The non-spherical Earth model is represented by the World Geodetic Survey 84 Model (WGS84) of degree and order 18. Third body perturbations due to the Sun and the Moon are based on the Jet Propulsion Laboratory's DE403 Solar, Planetary, and Lunar Ephemeris. Solar radiation pressure is modeled as a flat plate model with specified reflectivity and projected area. The resulting solar pressure force is directed along the sun-to-spacecraft line. The acceleration due to thrust is modeled as a net thrust vector that points through the spacecraft center of gravity directed along a direction specified by a right ascension and declination referenced to the Earth fixed system. All of the perturbing force vectors, and hence the resulting spacecraft motion, are referred to an Earth Centered Inertial, Mean Equator and Equinox of J2000 coordinate frame.

Equations of Motion

The spacecraft state is a seven element vector defined by the Cartesian position and velocity vectors, and the spacecraft mass, $$x(t) = \begin{pmatrix} r(t) \\ v(t) \\ m(t) \end{pmatrix}$$

The equations of motion are $$\frac{d^2 r}{dt^2} = g(t, r) + \frac{T(t)}{m(t)} u(t) + f(t, r, v)$$

$$\frac{dm}{dt} = \frac{T(t)}{c}$$

where $g(t,r)$ acceleration due to the Geopotential $T(t)$ thrust $m(t)$ mass $u(t)$ thrust unit vector $f(t,r,v)$ acceleration vector due to perturbations $c$ exhaust velocity of the thruster(s)

$t$ independent variable

The exhaust velocity is defined as $$c = Isp \times g_0$$

where

Isp specific impulse of the thruster(s) in seconds $g_0$ value of Earth surface gravity The thrust unit vector, $u(t)$, is defined by the thrust right ascension and declination angles, $\alpha$ and $\beta$, $$u = \begin{pmatrix} u_x \\ u_y \\ u_z \end{pmatrix} = \begin{pmatrix} \cos\alpha\cos\beta \\ \sin\alpha\cos\beta \\ \sin\beta \end{pmatrix}$$

Propulsion Model

A simple linear thrust and ISP degradation model that is a function of accumulated thruster on-time is used to compute both thrust and ISP for each of the four XIPS thrusters. On station, the spacecraft's XIPS thrusters are all on the anti-nadir face in a square configuration. Due to power constraints, only two thrusters can be used simultaneously during orbit transfer. The mass flow for each of the XIPS thrusters will be assumed to be constant throughout the transfer mission so that if there is a degradation in thrust, ISP will also be degraded. For each XIPS thruster, the thrust variation model is given by $$T(t) = \min\left(\left(T_0 + \left(\frac{dT_0}{dt}\right)\right), \left(T_1 + \left(\frac{dT_1}{dt}\right)\right)\right)$$

where $T(t)$=thrust at time t $T_0$=initial reference thrust value $dT_0/dt$=initial thrust variation rate $T_1$=intermediate thrust reference value $dT_1/dt$=intermediate thrust variation rate t=thruster accumulated on-time This thrusting model assumes a piecewise linear thrust variation during transfer orbit operations. The values for the parameters defining these lines will be determined from orbit estimation and maneuver reconstruction studies. In this model, it is assumed that $T_0<T_1$ and $dT_1/dt<dT_0/dt<0$ so that the line $T_0+dT_0/dt$ will be followed during the first part of the mission and the line $T_1+dT_1/dt$ will be followed during the second part. In this way, the thrust profile for a XIPS thruster will follow a constant or shallow degradation during the early part of the mission, provided $dT_0/dt$ is small and then a steeper degradation during the later part. It is expected that the performance of the XIPS thrusters will be similar to this variation.

Operational Constraints

1. Attitude Calibration Coasts

During XIPS thrust arcs, the on board attitude estimator requires gyro rate integration in addition to 2-axis Sun sensor measurements. Because of gyro drift and gyro rate bias estimate errors, this system drifts around the Sun line. To calibrate this attitude error, it is required to rotate the spacecraft to acquire the Earth in the Earth sensor. This reorientation, Earth acquisition, and attitude calibration requires a coast period of about 90 minutes every three to four days. Further, there are conditions where these coast periods can occur during the transfer orbit.

Consider a spacecraft local frame where the y-axis points towards the Earth and the x-axis lies in the orbit plane in the direction of the velocity vector. Let $r_s$ be the unit vector from the spacecraft position to the sun. Let $r_s'$ be the projection of $r_s$ on to the x-y plane and let $\psi_s$ be the angle between $r_s'$ and the y-axis. Also, let $\epsilon_r$ be the radius of the Earth disk as seen from the spacecraft. To insure proper Sun-Earth angular separation and Earth distance, an attitude calibration coast can occur if $-45° \leq \psi_s \leq 135°$ and $8.7° \leq \epsilon_r \leq 10°$ These form part of the inequality constraints in the optimization algorithm.

2. Sun Angle Constraints

To insure that the Sun is always visible in the Sun sensor on board the spacecraft, the thrust vector needs to be constrained relative to the Sun line. This constraint is different from the east and west pair thrusters. The Sun polar angle, $\theta_s$, is defined as the angle between the thrust vector and $r_s$, $$\theta_s = arc\ cos(r_s \cdot u)$$

The constraint on $\theta_s$ is $\theta_s \leq 90°$ for the west thruster pair $\theta_s \leq 130°$ for the east thruster pair These are also treated as inequality constraints in the optimization algorithm.

3. Eclipse Constraint

The XIPS thrusters are required to be off during Earth shadow because the solar panels are unable to provide to them the required power. These eclipse periods are expected to be less the 72 minutes. During the computation of the transfer orbit in the presence of eclipses, the XIPS thrusters are turned off prior to entry into the penumbra cone with a buffer of about 15–30 minutes. Thrusting can resume after exiting the penumbra cone, however, the time between exiting the penumbra cone and the beginning of the next thrust arc is part of the optimization parameters. The conditions for determining whether the spacecraft is in eclipse is based on a simple point source model for the Sun.

Transfer Strategy

The nominal transfer strategy is to burn continuously around the orbit in such a way that both the eccentricity and inclination are reduced to zero and the period of the orbit is maintained to be geosynchronous. The thrust right ascension is generally perpendicular to the semi-major axis and is towards the apogee velocity direction to reduce eccentricity. Deviations of the thrust vector from this attitude is required to compensate for perturbations. The transfer is broken into segments and the thrust attitude is held inertially fixed for the duration of a thrust segment. The thrust vector attitude and total transfer duration are optimized. This transfer strategy is subdivided into three modes:

Mode 1: In this mode, an estimate for the total transfer time (TOD) is given. Also given is the number of segments to be flown. Based on this transfer time, the entire trajectory is divided by the number of segments so each segment has the same duration. The thrust vector attitude for each segment forms part of the search vector. In addition, the initial coast period prior to thrusting and the total transfer time are also determined. There is a coast period for reorientations between segments whose length in time is specified.

Mode 2: In this mode, a total number of segments is specified. The length in time for each of the segments is specified and held fixed except for the last one which is determined. The orientation of the thrust vector is determined for each segment along with the initial coast period before thrusting begins. As before, a coast period can also be placed between each segment.

Mode 3: This mode is used primarily during transfer orbit operations. Its primary purpose is to include a coast period to allow for attitude and Earth acquisition calibration tests. These are required every few days during the course of the transfer. A total number of segments is specified. The length in time for each of these is also specified initially and determined by the program. The coast period between each segment is also determined. The initial estimate for the segment durations should be near the time in which these coast periods should be made. The program determines the length of both the thrusting segments and coast periods in order to satisfy the requirements of where these coast periods are allowed to be placed. The coast period in the initial orbit prior to thrusting is also determined.

Initial Guess Estimator

A reasonable estimate for the search parameters prior to invoking the optimization algorithm is normally required for initiating a convergent optimization sequence. Such an estimate can be found by solving a simple set of low dimensional nonlinear root finding problems. This algorithm is referred to as the Initial Guess Estimator (IGE), and can prove to be very useful when analyzing a particular transfer problem for the first time. The IGE is composed of a sequence of calculations described below.

Given an injection orbit with a nonzero eccentricity and inclination, the IGE begins with a two segment transfer to reduce both inclination and eccentricity to zero. First, the in plane component of the thrust vector direction is perpendicular to the semimajor axis in the direction of the apogee velocity vector. The first part of the IGE invokes a two dimensional search for the out of plane thrust angle, $\beta_1$, and a time $t_1$, that will drive the inclination to zero. Effectively, this two dimensional search targets the x and y components of the angular momentum vector to be zero, i.e., the search finds $\beta_1$ and $t_1$ such that $h_x = h_y = 0$. Once this search is complete, the trajectory is in the equatorial plane with a nonzero eccentricity. The IGE continues with another two dimensional search that computes $\alpha_2$ and the remaining time, $t_2$, that will drive the eccentricity to zero. The two search parameters are $\alpha_2$, $t_2$, and the targets are $e_x = e_y = 0$. This search is followed by a five dimensional search where the existing values for the computed parameters are recomputed. The search parameters now become $\alpha_1$, $\beta_1$, $\alpha_2$, $\beta_2$, TOD and the targets are $h_x = h_y = e_x = e_y = 0$ and $h_z = h_{geo}$.

Once the IGE has been used, a two segment transfer that satisfies the orbit targets is available. This two segment transfer is then recast as multi-segment transfer that can be optimized with the standard algorithm used to compute the complete transfer with more segments and the inclusion of all of the operational constraints.

Referring to FIG. 1, a spacecraft 10 launched from a position on the earth 12 follows a path predetermined in accordance with parameters of the launch vehicle and settles into a nearly geosynchronous, elliptical, and inclined orbit defined herein as the injection orbit 16. The optimal transfer orbit trajectory mechanism and apparatus determines how to translate the spacecraft 10 from the injection orbit 16 to a geostationary orbit 18. During the launch sequence, the spacecraft 10 separates from first, intermediate, and final stages as schematically shown at reference numeral 20 before reaching injection orbit 16. The number of stages from which spacecraft 10 separates during launch to injection orbit 16 depends upon the parameters, capabilities, and particular application for the launch vehicle. Such parameters, capabilities, and applications vary widely, but are well known to persons skilled in the art.

Figure 2:
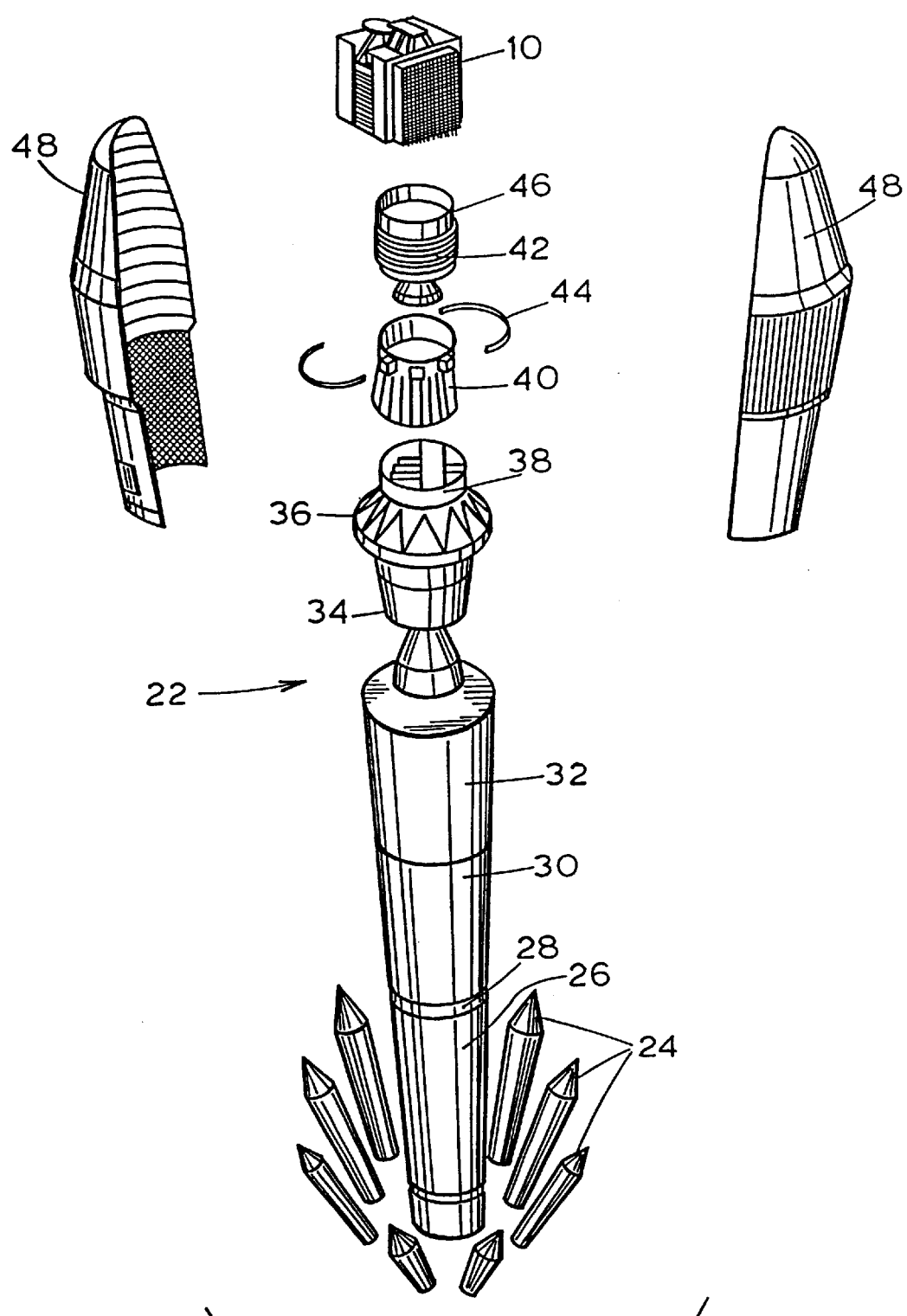
FIG. 2 is a perspective partial exploded view of a launch vehicle and satellite.

Referring to FIG. 2, the spacecraft 10 is shown with other component parts which comprise launch vehicle 22. Launch vehicle 22 shown in FIG. 2 is commonly referred to as a DELTA 7925 launch vehicle and is merely exemplary of one of a number of launch vehicles known to persons skilled in the art. The component parts of launch vehicle 22 include thrust augmentation solids 24, first stage oxidizer tank 26, center body 28, and fuel tank 30, all of which comprise the first stage of launch vehicle 22. Interstage 32 links fuel tank 30 to second stage 34 and also provides additional propulsion. Second stage 34 includes truss 36 for supporting guidance electronics 38. Guidance electronics 38 attaches to spin table 40 which in turn attaches to third stage motor 42 via clamp bands 44. Third stage motor 42 attaches to spacecraft 10 via attached fitting 46. During launch, fairings 48 provide protection for second stage 34, third stage motor 42, spacecraft 10 and the various associated components therewith. After launch vehicle separation 20 of FIG. 1, only spacecraft 10 continues to injection orbit 16.

In operation, launch vehicle 22 is supported on a launch pad (not shown) on the earth 12 and loaded with the appropriate fuels in preparation for lift-off. At lift-off, first stage components 24–30 operate as described above and provide initial thrust to propel launch vehicle 22 off of the launch pad. At a predetermined time in the launch sequence the first stage will detach, at which time interstage 32 activates to provide thrust. Similarly, interstage 32, second stage 34, and third stage 42 will sequentially provide thrust, then detach from the remainder of launch vehicle 22. Also at a predetermined time, the fairings 48 will separate and be jettisoned exposing second stage 34, third stage 42, and spacecraft 10. Eventually, after all components have separated from launch vehicle 22, only spacecraft 10 remains and continues to injection orbit 16. Note that the above described launch vehicle 22 and launch sequence are merely exemplary, and it will be recognized by one skilled in the art that the invention described herein is equally applicable to any of a number of various launch vehicles and launch sequences.

Figure 3:
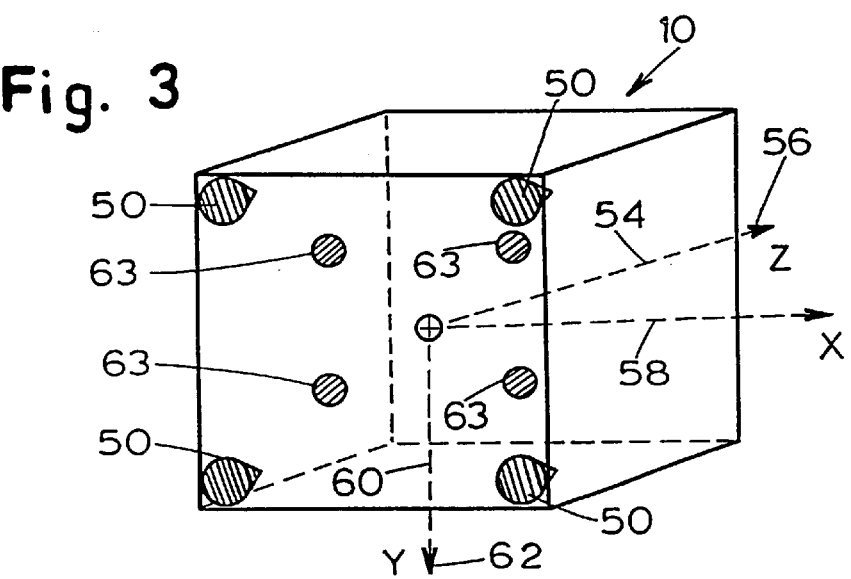
FIG. 3 schematically depicts a spacecraft as shown in FIG. 2 having mounted thereon electric propulsion thrusters for effecting translation of the spacecraft to geostationary orbit and for performing stationkeeping functions.

Referring to FIG. 3, a thruster positioning diagram of spacecraft 10 is shown. Spacecraft 10 may be one of any of a number of shapes and sizes known in the art, which typically depends upon the particular application for which the spacecraft is to be used. Spacecraft 10 has a center of mass 52 through which pass three axes, a Z axis 54, an X axis 58, and a Y axis 60. The Z axis 54, X axis 58, and Y axis 60 are shown extending in a positive direction in accordance with arrows 56, 60, and 62, respectively. Spacecraft 50 includes electric propulsion thrusters 50 arranged so that when activated, spacecraft 10 experiences a force in the positive direction of Z axis 54. Electric propulsion thrusters 50 may optionally be canted so the thrust vector of any particular electric propulsion thruster 50 is slightly off parallel from the positive Z axis in order to provide redundant directional thrust for use as a backup, secondary attitude control system. However, the resultant thrust vector when all electric propulsion thrusters 50 fire preferably parallels positive Z axis 54.

Additional electric propulsion thrusters 63 primarily provide thrust for performing attitude control and stationkeeping of spacecraft 10. Typically, electric propulsion thrusters 63 are smaller and provide less thrust than electric propulsion thrusters 50 because they only need exert relatively small forces to carry out relatively minor spacecraft positioning adjustments. Propulsion thrusters 63 are shown mounted on the same panel as propulsion thrusters 50, and are canted so that individually they exert resultant thrust inwardly towards center of mass 52. Electric propulsion thrusters 50 and 63 are preferably either xenon ion propulsion (XIPS) thrusters or arcjet propulsion thrusters. Typically, such XIPS thrusters generate a thrust level of about 165 milli-Newtons each and an effective specific impulse (ISP) on the order of 3,800 seconds.

Although propulsion thrusters 50 and 63 preferably electric propulsion thrusters, and are referred to accordingly throughout this specification, will be understood by persons skilled in the art that propulsion thrusters 50 or 63 may be replaced by chemical propulsion thrusters. As noted above, electric propulsion thrusters provide much lower thrust than chemical propulsion thrusters, but deplete significantly less mass per the amount of thrust delivered.

Figure 4:
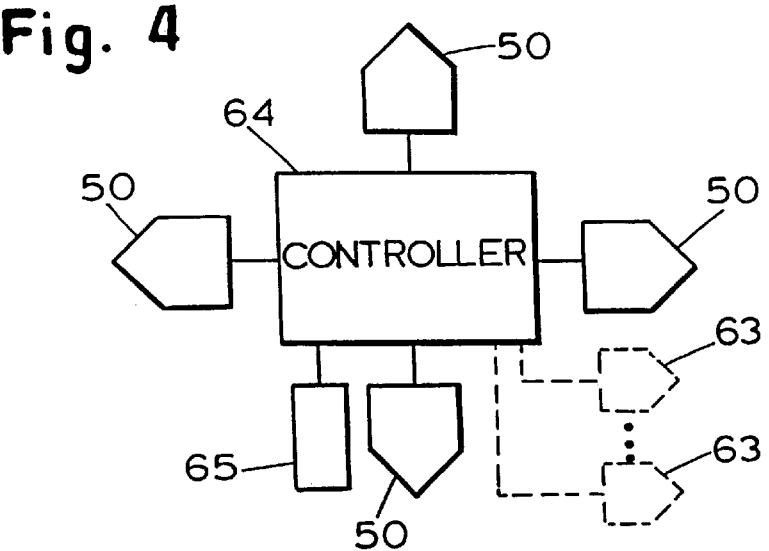
FIG. 4 illustrates generally the controller portion of the spacecraft for operating the electric propulsion thrusters for translation to geostationary orbit.

Referring to FIG. 4, controller 64 selectively activates electric propulsion thrusters 50. Controller 64 may optionally control the firing of electric thrusters 63 to provide attitude control. In operation, controller 64 receives input information from sensor block 65 (that includes a Sun sensor and an Earth sensor) and determines if electric propulsion thrusters 50 should be activated. Sensor block 65 provides input data such as attitude, orientation, and position with respect to earth 12. Controller 64 evaluates such information and generates appropriate control signals in response to the received information. Controller 64 may also optionally control other spacecraft functions and operate as an integrated spacecraft controller. Furthermore, controller 64 may provide other than simply firing sequences for transfer orbit propulsion thrusters 50. For example, controller 64 may effect communication between spacecraft 10 control systems, may communicate with ground or space based receivers-transmitters, or may control other instrumentation as required by the particular application.

Figure 5:
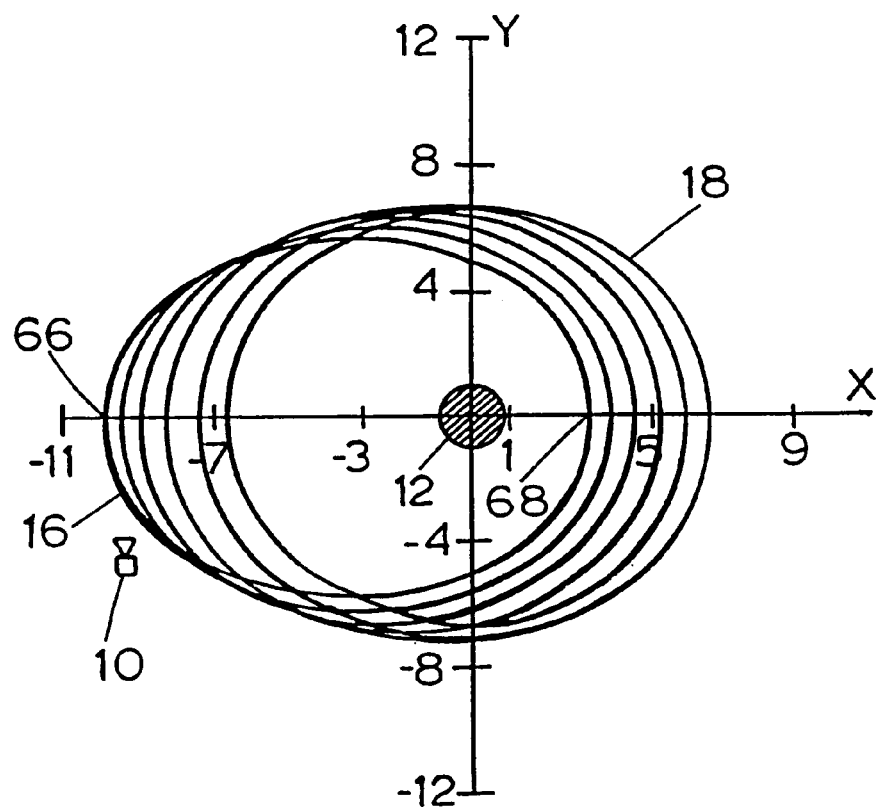
FIG. 5 depicts an exemplary minimum time trajectory between an injection orbit and a final geostationary orbit.

FIG. 5 depicts a transfer orbit trajectory sequence of spacecraft 10 from injection orbit 16 to geostationary orbit 18. Referring to FIG. 5, spacecraft 10 is shown in injection orbit 16 (which is nearly geosynchronous) orbiting around a central body such as the earth 12. Geostationary orbit 18 is also depicted in FIG. 5. Injection orbit 16 is an elliptical orbit having an apogee 66 and a perigee 68 which are defined as the highest and lowest points, respectively, of the elliptical orbit with respect to earth 12. It will be recognized by one skilled in the art that injection orbit 16 is attained in accordance with a number of predetermined application parameters. Specifically, the speed of spacecraft 10 at perigee 68 and the height of perigee 68 define the height of apogee 66 and the eccentricity of the elliptical injection orbit 16.

Figure 6:
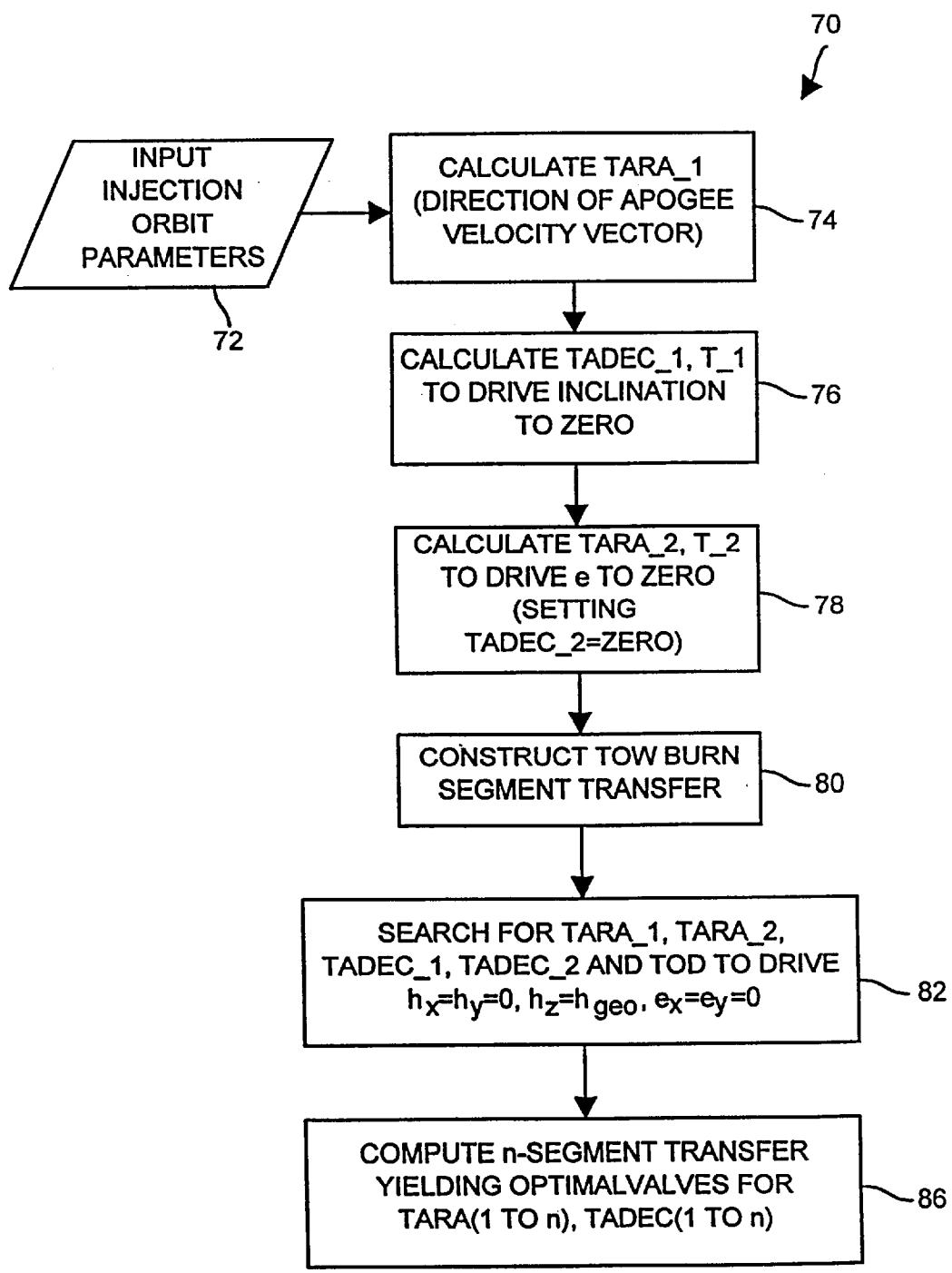
FIG. 6 is a flow diagram of an orbit transfer algorithm implemented by the controller for firing the electric propulsion thrusters to reach geostationary orbit.

Referring to FIG. 6, an orbit transfer algorithm 70 in accordance with the present invention operates as follows. Given an input at block 72 of an injection orbit 16 that is nearly geosynchronous, eccentric, and inclined with respect to the equatorial plane of the Earth, a thrust vector is calculated at block 74 that is perpendicular to the semi-major axis of the initial orbit and has a component in the orbital plane (TARA, Thrust Axis Right Ascension) that is in the direction of the spacecraft velocity at apogee 66. The calculated in-plane component is termed TARA_1. Next, at block 76, the orbit transfer algorithm searches for an out of plane thrust component (TADEC, Thrust Axis Declination) and a thruster burn time that will drive inclination to zero. Eccentricity will be reduced automatically because at apogee 66, the thrust axis is in a direction that raises perigee, and at perigee 68, the thrust axis is in a direction that lowers apogee, thus circularizing the orbit. A nonlinear numerical root-finding algorithm such as the NS11 Non-linear Equation Solver subroutine from the Harwell Subroutine Library is used and the output is TADEC_1 and thruster burn time T_1.

Next, at block 78, the orbit transfer algorithm sets TADEC to zero (designated TADEC_2) and searches for a TARA and thruster burn time that will drive eccentricity to zero. This search also requires a nonlinear numerical root-finding algorithm and outputs values for TARA_2 and thruster burn time T_2.

Next, at block 80, the orbit transfer algorithm constructs a two-burn transfer starting with the original initial orbit.

The thrust factor for the first segment of the transfer is given by TARA_1 and TADEC_1. The thrust vector for the second segment is given by TARA_2 and TADEC_2. The two-burn transfer orbit duration (TOD) is set equal to the sum of T_1 and T_2.

Next, at block 82, the orbit transfer algorithm searches for values of TARA_1, TARA_2, TADEC_1, TADEC_2, and TOD simultaneously that will: make the X and Y components of the angular momentum vector of the spacecraft, $h_x$ and $h_y$, equal to zero, make the z component of angular momentum vector, $h_z$ equal to the specific angular momentum of a geostationary orbit, $h_{geo}$; and make the x and y components of eccentricity, $e_x$ and $e_y$, equal to zero. Thus, five unknown quantities (TARA_1, TARA_2, TADEC_1, TADEC_2, and TOD) are determined given five known quantities ($h_x=0$, $h_y=0$, $h_{geo}$, $e_x=0$, $e_y=0$). Once again, a nonlinear numerical root-finding algorithm is used.

Next, at block 86, the orbit transfer algorithm computes an n-segment transfer that will search for an initial coast time (TAU_0) in the initial orbit, a total transfer time (TOD), and all of the thrust vector components, TARA (1 to n) and TADEC (1 to n), such that the spacecraft arrives on a geostationary orbit and over a preselected target Earth longitude. Optimal values for the aforementioned variables are found such that required fuel is minimized. Each thrusting segment is of duration TOD/n. This search requires a nonlinearly constrained parameter optimization algorithm, such as the VF13 Nonlinearly Constrained Parameter Optimization subroutine from the Harwell Subroutine Library. The number of segments, n, is chosen by the mission designer and should be greater than or equal to two.

As noted above with respect to FIG. 3, electric propulsion thrusters 50 and 63 described herein may be embodied as, but need not be limited to, either XIPS or arcjet electric propulsion systems. Alternatively, as also noted above, electric propulsion thrusters 50 and 63 may be embodied as a hybrid or complete chemical propulsion system. expectancy of the spacecraft 50% or greater.

A significant advantage realized by the method and apparatus described herein is that an equivalent beginning of life weight can be delivered to geostationary orbit 18 using much smaller and less expensive launch vehicles. For example, a spacecraft having a beginning of life weight which typically requires launch by an ATLAS or ARIANE 4L booster could be delivered by the much less expensive Delta II booster. By the same token, greater payloads can be delivered by identical launch vehicles if electric propulsion engines translate the spacecraft to geostationary orbit. The increased payload can be translated into spacecraft lifetime because electric propulsion requires much less mass for stationkeeping, approximately 5 kilograms per year, compared to chemical propulsion systems, approximately 27 kilograms per year. Further, the time required to achieve geostationary orbit has been optimized while utilizing a smaller launch vehicle for the same payload.

The present invention has been described with reference to specific examples, which are intended to be illustrative only, and not to be limiting of the invention, as it will be apparent to those of ordinary skill in the art that changes, additions and/or deletions may be made to the disclosed embodiments without departing from the spirit and scope of the invention.

What is claimed is:

1. A method of transferring a satellite from an initial orbit about the earth, the initial orbit having a first inclination and a first eccentricity, to a final orbit about the earth, the final orbit having a second inclination and a second eccentricity, using thruster means capable of providing a variable thrust vector, the method comprising the steps of:

calculating an estimate of thrust vectors and burn times for an optimal two-burn orbit transfer from the initial orbit to the final orbit, using a non-linear root finding algorithm; and computing thrust vectors and burn times for an optimal multi-segment orbit transfer from the initial orbit to the final orbit, using a nonlinearly constrained parameter optimization algorithm.

2. The method of claim 1, wherein the step of calculating the thrust vectors and burn times for the optimal two-burn orbit transfer from the initial orbit to the final orbit comprises a step of calculating a first-stage thrust vector that is perpendicular to the semi-major axis of the initial orbit and has a first-stage thrust component in the orbital plane that is in the direction of spacecraft velocity at apogee of the initial orbit.

3. The method of claim 2, wherein the step of calculating the thrust vectors and burn times for the optimal two-burn orbit transfer from the initial orbit to the final orbit further comprises a step of:

searching for a first-stage out of plane thrust component and a thruster burn time that will drive inclination to zero.

4. The method of claim 3, wherein the step of calculating the thrust vectors and burn times for the optimal two-burn orbit transfer from the initial orbit to the final orbit further comprises the steps of:

setting a second-stage out of plane thrust component to zero; and searching for a second-stage in-plane thrust component and thruster burn time that will drive eccentricity to zero.

5. A system for transferring a satellite from an initial orbit about the earth to a final orbit about the earth, the initial orbit having a first inclination and a first eccentricity, the final orbit having a second inclination and a second eccentricity, the satellite having thruster means capable of providing a variable thrust vector, the system comprising:

means for calculating an estimate of thrust vectors and burn times for an optimal two-burn orbit transfer from the initial orbit to the final orbit, the calculating means including a non-linear root finding algorithm; and means for computing thrust vectors and burn times for an optimal multi-segment orbit transfer from the initial orbit to the final orbit, the computing means including a nonlinearly constrained parameter optimization algorithm.

6. The system of claim 5, wherein the means for calculating the thrust vectors and burn times for the optimal two-burn orbit transfer from the initial orbit to the final orbit comprises means for calculating a first-stage thrust vector that is perpendicular to the semi-major axis of the initial orbit and has a first-stage thrust component in the orbital plane that is in the direction of spacecraft velocity at apogee of the initial orbit.

7. The system of claim 6, wherein the means for calculating the thrust vectors and burn times for the optimal two-burn orbit transfer from the initial orbit to the final orbit further comprises means for searching for a first-stage out of plane thrust component and a thruster burn time that will drive inclination to zero.

8. The system of claim 7, wherein the means for calculating the thrust vectors and burn times for the optimal two-burn orbit transfer from the initial orbit to the final orbit further comprises:

means for setting a second-stage out of plane thrust component to zero and for searching for a second-stage in-plane thrust component and thruster burn time that will drive eccentricity to zero.

9. A system for transferring a satellite from an initial orbit about the earth to a final orbit about the earth, the initial orbit having a first inclination and a first eccentricity, the final orbit having a second inclination and a second eccentricity, the satellite having thruster means capable of providing a variable thrust vector, the system comprising:

a first algorithm for calculating an estimate of thrust vectors and burn times for an optimal two-burn orbit transfer from the initial orbit to the final orbit, the first algorithm including a non-linear root finding algorithm; and a second algorithm for computing thrust vectors and burn times for an optimal multi-segment orbit transfer from the initial orbit to the final orbit, the second algorithm including a nonlinearly constrained parameter optimization algorithm.

10. The system of claim 9, wherein the first algorithm comprises a third algorithm for calculating a first-stage thrust vector that is perpendicular to the semi-major axis of the initial orbit and has a first-stage thrust component in the orbital plane that is in the direction of spacecraft velocity at apogee of the initial orbit.

11. The system of claim 10, wherein the first algorithm further comprises a fourth algorithm for searching for a first-stage out of plane thrust component and a thruster burn time that will drive inclination to zero.

12. The system of claim 11, wherein the first algorithm further comprises:

a fifth algorithm for setting a second-stage out of plane thrust component to zero and for searching for a second-stage in-plane thrust component and thruster burn time that will drive eccentricity to zero.

* * * * *